(12) United States Patent
Wu

(10) Patent No.: US 12,346,540 B2
(45) Date of Patent: Jul. 1, 2025

(54) COLLABORATIVE TASK PROCESSING METHOD, DEVICE, AND COMPUTER-READABLE STORAGE MEDIUM

(71) Applicant: Beijing Zitiao Network Technology Co., Ltd., Beijing (CN)

(72) Inventor: Danni Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/847,094

(22) PCT Filed: May 19, 2023

(86) PCT No.: PCT/CN2023/095271
§ 371 (c)(1),
(2) Date: Sep. 13, 2024

(87) PCT Pub. No.: WO2023/226891
PCT Pub. Date: Nov. 30, 2023

(65) Prior Publication Data
US 2025/0110621 A1   Apr. 3, 2025

(30) Foreign Application Priority Data

May 25, 2022 (CN) .......................... 202210577437.6

(51) Int. Cl.
*G06F 3/0484* (2022.01)
*G06F 3/0482* (2013.01)
(Continued)

(52) U.S. Cl.
CPC .......... *G06F 3/0484* (2013.01); *G06F 3/0482* (2013.01); *G06F 9/451* (2018.02); *G06Q 10/103* (2013.01)

(58) Field of Classification Search
CPC ...... G06F 3/0482; G06F 3/0484; G06F 9/451; G06Q 10/103
See application file for complete search history.

(56) References Cited

U.S. PATENT DOCUMENTS

| 2006/0107265 A1 | 5/2006 | Schulz et al. |
| 2010/0070463 A1 | 3/2010 | Zhao et al. |

(Continued)

FOREIGN PATENT DOCUMENTS

| CN | 104156465 A | 11/2014 |
| CN | 104376407 A | 2/2015 |

(Continued)

OTHER PUBLICATIONS

Notice of Allowance and Allowed Claims issued Mar. 8, 2024 in CN Appl. No. 202210577437.6, English translation (17 pages).

(Continued)

*Primary Examiner* — Seth A Silverman

(57) ABSTRACT

A collaborative task processing method, a device, and a computer-readable storage medium are provided. The method includes: displaying a collaborative task list related to a first user in a collaborative task center interface of the first user; determining, in response to a filter operation of the first user for filtering a collaborative task based on a task creation source type, a target task creation source type specified by the first user; filtering a collaborative task in the collaborative task list based on the target task creation source type; and displaying a filtering result in the collaborative task center interface of the first user.

20 Claims, 11 Drawing Sheets

(51) Int. Cl.
*G06F 9/451* (2018.01)
*G06Q 10/10* (2023.01)

(56) References Cited

U.S. PATENT DOCUMENTS

| | | | | |
|---|---|---|---|---|
| 2012/0260195 | A1* | 10/2012 | Hon | G06F 16/954 |
| | | | | 715/753 |
| 2014/0207867 | A1* | 7/2014 | Kotler | H04L 65/4015 |
| | | | | 709/204 |
| 2014/0236885 | A1* | 8/2014 | Muller | G06Q 10/10 |
| | | | | 707/608 |
| 2014/0237389 | A1* | 8/2014 | Ryall | G06Q 10/1097 |
| | | | | 715/753 |
| 2016/0277341 | A1 | 9/2016 | Garen | |
| 2021/0350303 | A1 | 11/2021 | Omar et al. | |
| 2023/0138836 | A1* | 5/2023 | Sharma | G06Q 10/10 |
| | | | | 705/301 |

FOREIGN PATENT DOCUMENTS

| | | | |
|---|---|---|---|
| CN | 106059895 | A | 10/2016 |
| CN | 107346199 | A | 11/2017 |
| CN | 107870805 | A | 4/2018 |
| CN | 107977715 | A | 5/2018 |
| CN | 109150901 | A | 1/2019 |
| CN | 305610692 | S | 2/2019 |
| CN | 110322158 | A | 10/2019 |
| CN | 111709698 | A | 9/2020 |
| CN | 112686552 | A | 4/2021 |
| CN | 113806049 | A | 12/2021 |
| CN | 114118937 | A | 3/2022 |
| CN | 114338576 | A | 4/2022 |
| CN | 114493541 | A | 5/2022 |
| CN | 114860126 | A | 8/2022 |
| CN | 114860126 | B | 4/2024 |
| JP | 2003044747 | A | 2/2003 |
| JP | 2005222246 | A | 8/2005 |
| WO | 2013102141 | A | 7/2013 |

OTHER PUBLICATIONS

Office Action issued Oct. 28, 2023 in CN Appl. No. 202210577437.6, English translation (26 pages).
International Search Report issued Jun. 23, 2023 in PCT/CN2023/095271, English translation (11 pages).
Notice of Reasons for Refusal for Japanese Application No. 2024-554637, mailed Mar. 25, 2025, 6 pages.

* cited by examiner

| Shared document 1 | |
|---|---|
| This is a test document<br><br>task. We will welcome your test results.<br><br>Holiday notice of the Dragon Boat Festival<br><br>To all the departments, this year's Dragon Boat Festival holiday is scheduled as follows: In accordance with the national standard, there will be a three-day holiday for all the departments. | Save<br><br>Save as<br><br>Task<br><br>File management<br><br>Settings |

Fig. 5b

| Shared document 2 | |
|---|---|
| <br><br><br>Holiday notice of the Dragon Boat Festival \| Mark / Annotate / Add a task<br><br><br> | Save<br><br>Save as<br><br>Task<br><br>File management<br><br>Settings |

Fig. 5c

| Task collaborative center | |
|---|---|
| All tasks | Collaborative task list |
| | 🏠 Xiao Wang |
| | ▽ Assigned by me     Time of assignment |
| | Task 1     Two weeks ago |
| Recent collaborators | |
| 🏠 Xiao Wang | |
| (Bai) Bai Sheng | |
| 👤 TINA | ▽ Assigned to me     Time of assignment to me |
| 🐧 Ka | Task 2     Yesterday |

Fig. 6b

| Task collaborative center | |
|---|---|
| Task description information | Collaborative task list |
| Assigned by me | Task 1 |
| Assigned to me | Task 2 |
| Task unscheduled | Task 3 |
| Task with no responsible person designated to | Task 4 |
| Completed | |
| Expired | |

Fig. 6c

| Task collaborative center | |
|---|---|
| Task description information<br><br>Assigned by me<br><br>Assigned to me<br><br>Task unscheduled<br><br>| Task with no responsible person designated to |<br><br>Completed<br><br>Expired | Collaborative task list<br><br>Task 3<br><br>Task 5 |

COLLABORATIVE TASK PROCESSING METHOD, DEVICE, AND COMPUTER-READABLE STORAGE MEDIUM

The present disclosure is a U.S. national stage application of International Patent Application No. PCT/CN2023/095271, filed on May 19, 2023, which claims the priority to Chinese Patent Application No. 202210577437.6, filed on May 25, 2022, which is incorporated herein by reference in its entirety as a part of the present application.

TECHNICAL FIELD

Embodiments of the present disclosure relate to a collaborative task processing method and apparatus, a device, and a computer-readable storage medium.

BACKGROUND

In the field of collaborative office, a task (also referred to as "to-do") system is a commonly used application. An existing task system provides a user with a collaborative task center, through which the user can create tasks and view all tasks related to the user in the task system. Currently, the user can filter collaborative tasks in an interface of the collaborative task center based on progresses of the collaborative tasks. However, in this task filtering manner, the user can filter tasks based on only processes of the tasks. The filtering manner is excessively limited and cannot satisfy an increasing task filtering requirement of the user.

SUMMARY

Embodiments of the present disclosure provide a collaborative task processing method and apparatus, a device, and a computer-readable storage medium.

In a first aspect, an embodiment of the present disclosure provides a collaborative task processing method. The method includes:
 displaying a collaborative task list related to a first user in a collaborative task center interface of the first user;
 determining, in response to a filter operation of the first user for filtering a collaborative task based on a task creation source type, a target task creation source type specified by the first user;
 filtering a collaborative task in the collaborative task list based on the target task creation source type; and
 displaying a filtering result in the collaborative task center interface of the first user.

In a second aspect, an embodiment of the present disclosure provides a collaborative task processing apparatus. The apparatus includes:
 a list display unit configured to display a collaborative task list related to a first user in a collaborative task center interface of the first user;
 a type determining unit configured to determine, in response to a filter operation of the first user for filtering a collaborative task based on a task creation source type, a target task creation source type specified by the first user;
 a task filtering unit configured to filter a collaborative task in the collaborative task list based on the target task creation source type; and
 a result display unit configured to display a filtering result in the collaborative task center interface of the first user.

In a third aspect, an embodiment of the present disclosure provides an electronic device. The electronic device includes:
 a processor; and
 a memory configured to store computer executable instructions that, when executed by the processor, cause the processor to implement the steps of the method described in the first aspect above.

In a fourth aspect, an embodiment of the present disclosure provides a computer-readable storage medium, configured to store computer-executable instructions that, when executed by a processor, cause the steps of the method described in the first aspect above to be implemented.

In the embodiments of the present disclosure, the collaborative task list related to the first user is first displayed in the collaborative task center interface of the first user. Then, the target task creation source type specified by the first user is determined in response to the filter operation of the first user for filtering the collaborative task based on the task creation source type. Next, the collaborative task in the collaborative task list is filtered based on the target task creation source type. Finally, the filtering result is displayed in the collaborative task center interface of the first user.

BRIEF DESCRIPTION OF DRAWINGS

To describe one or more embodiments of the present disclosure more clearly, the following briefly describes the accompanying drawings required for describing the embodiments. Apparently, the accompanying drawings in the following descriptions show merely some embodiments described in the present disclosure, and those of ordinary skill in the art may derive other drawings from these accompanying drawings without creative efforts.

FIG. 5b is a schematic diagram of a task creation source interface according to another embodiment of the present disclosure;

FIG. 5c is a schematic diagram of creating a collaborative task based on a shared document according to another embodiment of the present disclosure;

FIG. 6b is a schematic diagram of updating a collaborative task list according to another embodiment of the present disclosure;

FIG. 6c is a schematic diagram of updating a collaborative task list according to another embodiment of the present disclosure;

DETAILED DESCRIPTION

Figure 1:
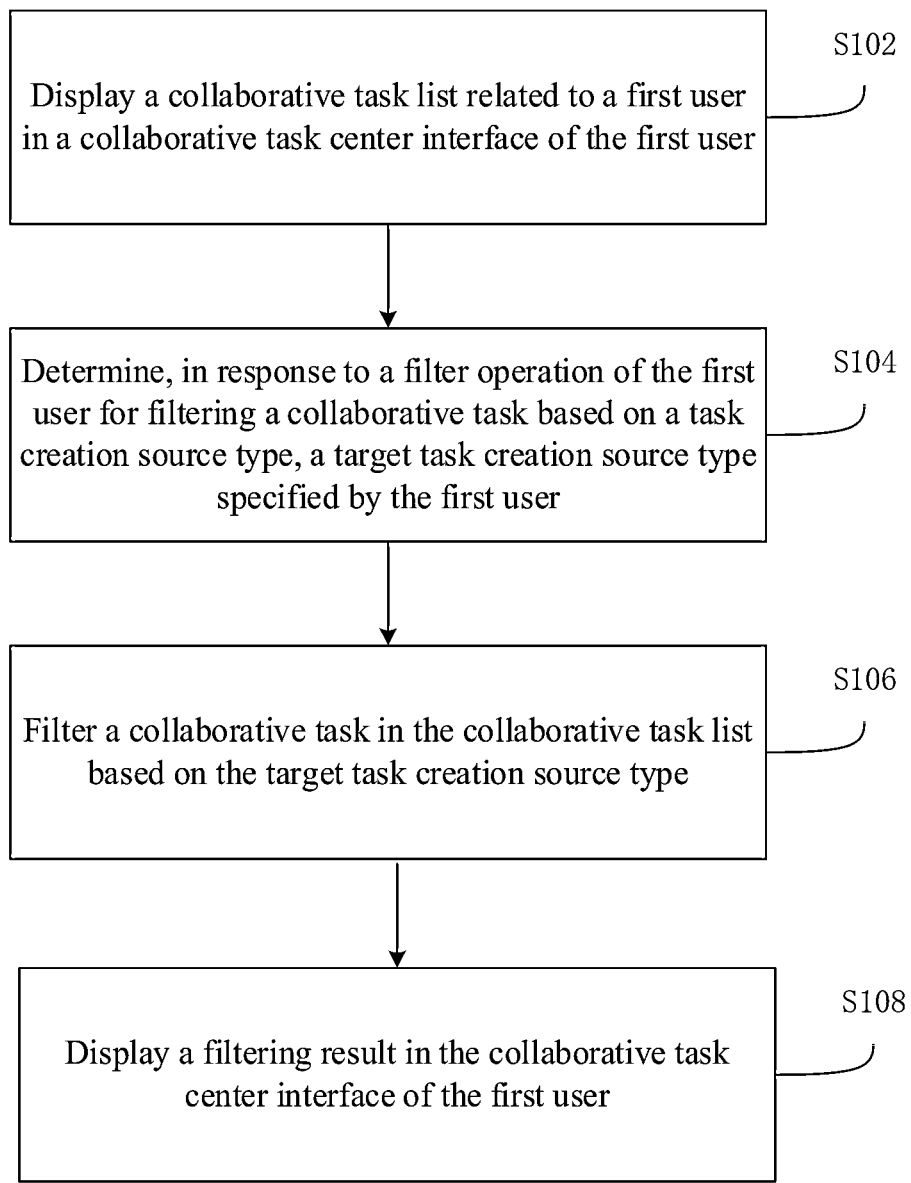
FIG. 1 is a schematic flowchart of a collaborative task processing method according to an embodiment of the present disclosure.

In order to make those skilled in the art understand the technical solutions in the one or more embodiments of the present disclosure better, the technical solutions in the one or more embodiments of the present disclosure will be clearly and completely described below with reference to the accompanying drawings in the one or more embodiments of the present disclosure. Apparently, the described embodiments are merely some rather than all of the embodiments of the present disclosure. All the other embodiments obtained by those of ordinary skill in the art based on the one or more embodiments of the present disclosure without any creative efforts shall fall within the scope of protection of the present disclosure.

A collaborative task center involved in the embodiments of the present disclosure is located in a task system, and the task system may be an application located inside collaborative office software. The collaborative office software is a type of office software for internal employees of large enterprises. The collaborative office software integrates various applications such as instant messaging, a cloud document, audio and video conferencing, the task system, etc., greatly improving the of collaborative office efficiency of the employees of the large enterprises.

In an aspect, a user may create a collaborative task in the task system in the collaborative office software, or may create a collaborative task in another application in the collaborative office software other than the task system, for example, create the collaborative task in instant messaging and the cloud document. The another application in the collaborative office software other than the task system is connected to the task system, and the collaborative task created by the user in the another application other than the task system can be synchronized to the task system.

An implementation of connecting the another application in the collaborative office software other than the task system to the task system to implement synchronization of the collaborative task is: The collaborative office software may provide a set of block-based framework, which is a set of standard framework that allows any application integrated in the collaborative office software to expose internal information, convert the internal information into a data segment in a standard format and display the data segment. A combination of the data segment in the standard format and a view of the data segment is a component, that is, a block. With the block-based framework, an interactive application fragment that is flexibly displayed can be created and developed on any application integrated in the collaborative office software, and the application fragment can be transferred between the applications in the collaborative office software in a form of a block. The block may be embedded and displayed in any application integrated in the collaborative office software. When a same application fragment is embedded and displayed in different applications, a same block is essentially embedded and displayed. Based on this, the collaborative task may be created in the another application in the collaborative office software other than the task system based on the block-based framework, and the collaborative task is transferred to the task system in the form of a block, so that the collaborative task is embedded and displayed in the task system.

In another aspect, for a specific external third-party system other than the collaborative office software, such as a work order system, after a user performs a specific operation in the external third-party system, such as a work order creation operation, the external third-party system may invoke an application programming interface (API) provided by the task system, to create a collaborative task and synchronize the collaborative task to the task system.

It can be seen from the two aspects that the collaborative task in the task system may be created by the user in the task system, created by the user in the another application in the collaborative office software other than the task system, or created by the user in the external third-party system. Therefore, the collaborative task of the user in the task system has a plurality of creation sources, including, but not limited to, the task system, instant messaging, the cloud document, audio and video conferencing, external third-party systems, etc.

Based on this, an embodiment of the present disclosure provide a collaborative task processing method, which can filter a collaborative task in a collaborative task center interface of a first user in a task system in response to a filter operation of the first user for filtering a collaborative task based on a task creation source type, and display a filtering result, thereby alleviating the problem that a current task filtering manner is excessively limited, satisfying an increasing task filtering requirement of a user, and improving user experience in collaborative task processing.

FIG. 1 is a schematic flowchart of a collaborative task processing method according to an embodiment of the present disclosure. As shown in FIG. 1, the procedure includes the following steps.

Step S102: Display a collaborative task list related to a first user in a collaborative task center interface of the first user.

Step S104: Determine, in response to a filter operation of the first user for filtering a collaborative task based on a task creation source type, a target task creation source type specified by the first user.

Step S106: Filter a collaborative task in the collaborative task list based on the target task creation source type.

Step S108: Display a filtering result in the collaborative task center interface of the first user.

In this embodiment of the present disclosure, the collaborative task list related to the first user is first displayed in the collaborative task center interface of the first user. Then, the target task creation source type specified by the first user is determined in response to the filter operation of the first user for filtering the collaborative task based on the task creation source type. Next, the collaborative task in the collaborative task list is filtered based on the target task creation source type. Finally, the filtering result is displayed in the collaborative task center interface of the first user. It can be seen that according to this embodiment, the collaborative task can be filtered in the collaborative task center interface of the first user in response to the filter operation of the first user for filtering the collaborative task based on the task creation source type, and the filtering result can be displayed. Therefore, the problem that a current task filtering manner is excessively limited is alleviated, an increasing task filtering requirement of a user is satisfied, and user experience in collaborative task processing is improved.

In an embodiment, a task creation source type of a collaborative task of the first user in a task system includes, but is not limited to, a common task, a chat, a shared document, an external third-party system, etc. A collaborative task whose task creation source type is the "common task" is a collaborative task created through a task creation entry provided by the task system or a shortcut provided by the task system. The task creation entry provided by the task system may be located in a main interface of collaborative office software used by the first user or in the collaborative task center interface of the first user in the task system.

A collaborative task whose task creation source type is the "chat" is a collaborative task created based on a chat in an instant messaging application integrated in the collaborative office software. When the collaborative task is created based on the chat, the collaborative task may be created based on a specific chat message in the chat, or may be created based on a task creation entry provided in the chat. The task creation entry provided in the chat may be located in a sidebar of the chat or near a message input box of the chat.

A collaborative task whose task creation source type is the "shared document" is a collaborative task created through a shared document application (i.e., the aforementioned cloud document application) integrated in the collaborative office software. When the collaborative task is created through the shared document application, the collaborative task may be created based on part of document content in a shared document, or may be created based on a task creation entry provided in the shared document application. The task creation entry provided in the shared document application may be located in a sidebar of an interface of the shared document application.

A collaborative task whose task creation source type is the "external third-party system" is a collaborative task created through a specific external third-party system associated with the collaborative office software. When the collaborative task is created through the external third-party system, the user may perform a specific operation in the external third-party system. The external third-party system creates, based on the specific operation, the collaborative task by invoking an API provided by the task system, and synchronizes the collaborative task to the task system.

Figure 2A:
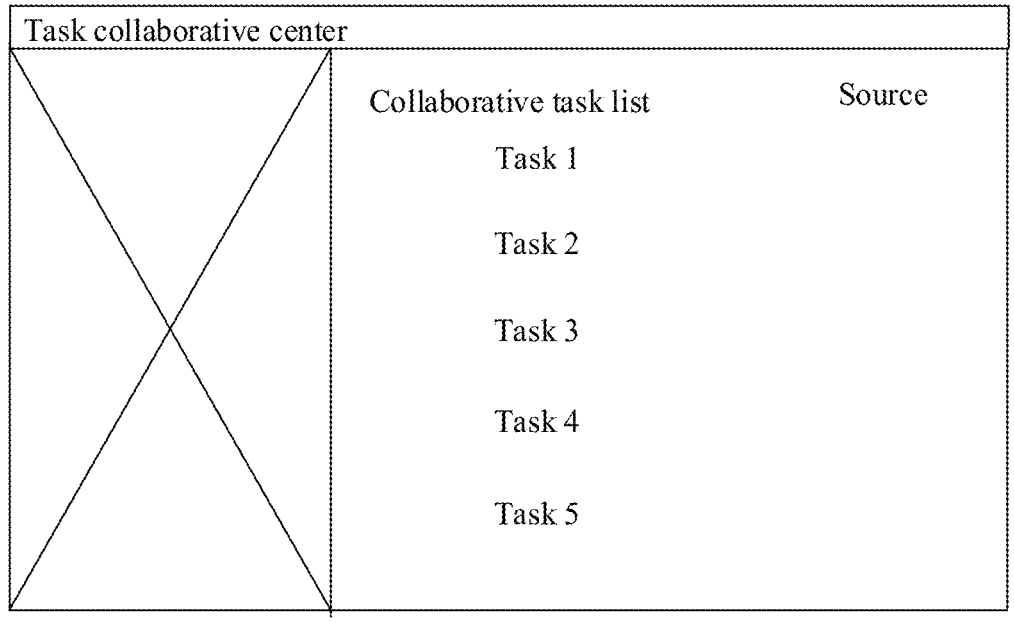
FIG. 2a is a schematic diagram of filtering a collaborative task based on a task creation source type according to an embodiment of the present disclosure.
Figure 2B:
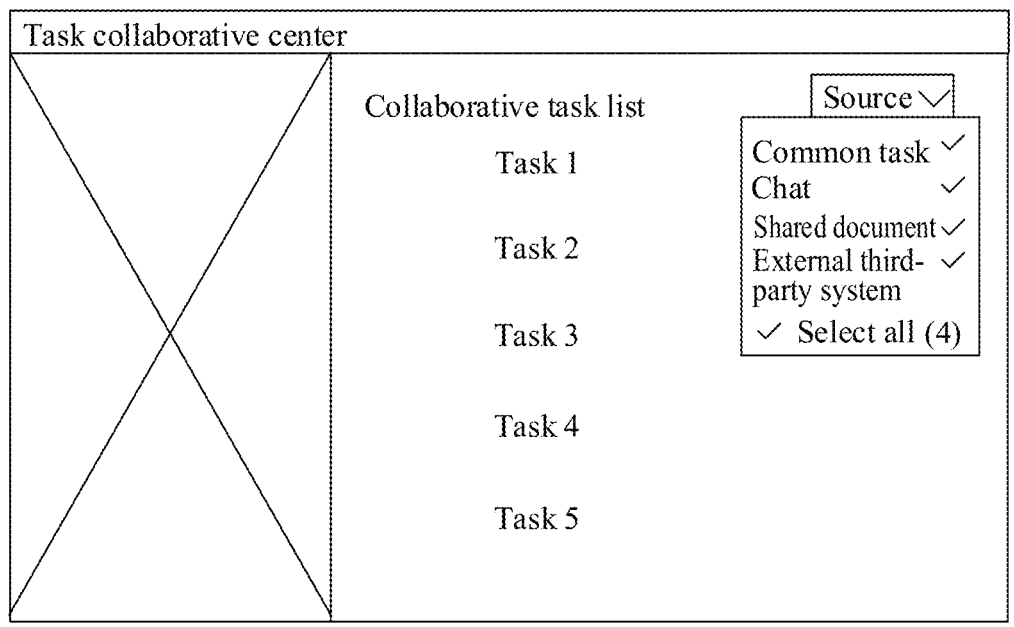
FIG. 2b is a schematic diagram of filtering a collaborative task based on a task creation source type according to another embodiment of the present disclosure.
Figure 2C:
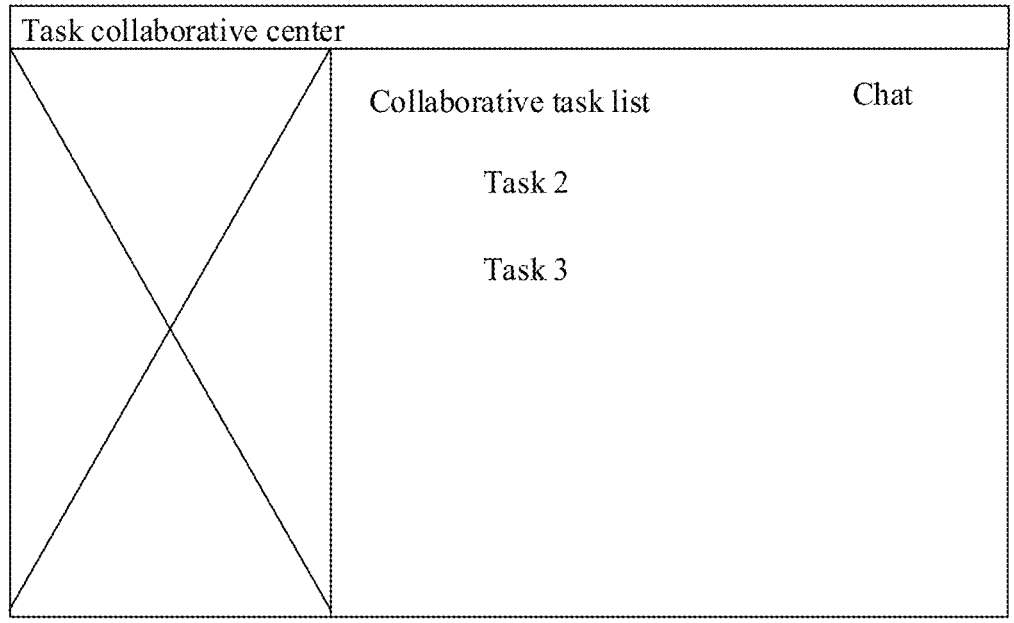
FIG. 2c is a schematic diagram of filtering a collaborative task based on a task creation source type according to still another embodiment of the present disclosure.

FIG. 2a is a schematic diagram of filtering a collaborative task based on a task creation source type according to an embodiment of the present disclosure. FIG. 2b is a schematic diagram of filtering a collaborative task based on a task creation source type according to another embodiment of the present disclosure. FIG. 2c is a schematic diagram of filtering a collaborative task based on a task creation source type according to still another embodiment of the present disclosure. As shown in FIG. 2a, the collaborative task list related to the first user is displayed in the collaborative task center interface of the first user. The collaborative task list related to the first user includes collaborative tasks related to the first user. The collaborative task related to the first user may be a collaborative task assigned by another user to the first user, a collaborative task assigned by the first user to another user, etc.

There is a control "Source" in an upper right corner of the collaborative task center interface of the first user that represents filtering a collaborative task based on a task creation source type. After the first user triggers the control, a plurality of drop-down options as shown in FIG. 2b may be displayed. Each drop-down option represents a task creation source type. The first user may select the target task creation source type from the plurality of drop-down options. If the first user selects "Chat" as the target task creation source type in FIG. 2b, the task system filters the collaborative tasks in the displayed collaborative task list based on the target task creation source type selected by the first user, and displays a filtering result in the collaborative task center interface of the first user, specifically in the collaborative task list related to the first user. As shown in FIG. 2c, collaborative tasks whose task creation source types are "Chat" are displayed in the collaborative task list related to the first user, so that the collaborative tasks obtained through filtering are displayed to the first user.

In FIG. 2b, the first user may select all the task creation source types with one click, or may unselect all the task creation source types with one click. After the first user selects one or more task creation source types, the selected type is displayed with a corresponding mark, and the number of types selected by the first user is displayed in the task collaborative center interface.

In an embodiment, after the collaborative task list related to the first user is displayed, the method may further include: obtaining a task creation source identifier corresponding to the collaborative task in the collaborative task list, and displaying the task creation source identifier in the collaborative task list; and displaying a task creation source interface of the collaborative task to the first user in response to a trigger operation of the first user on the task creation source identifier.

Figure 3A:
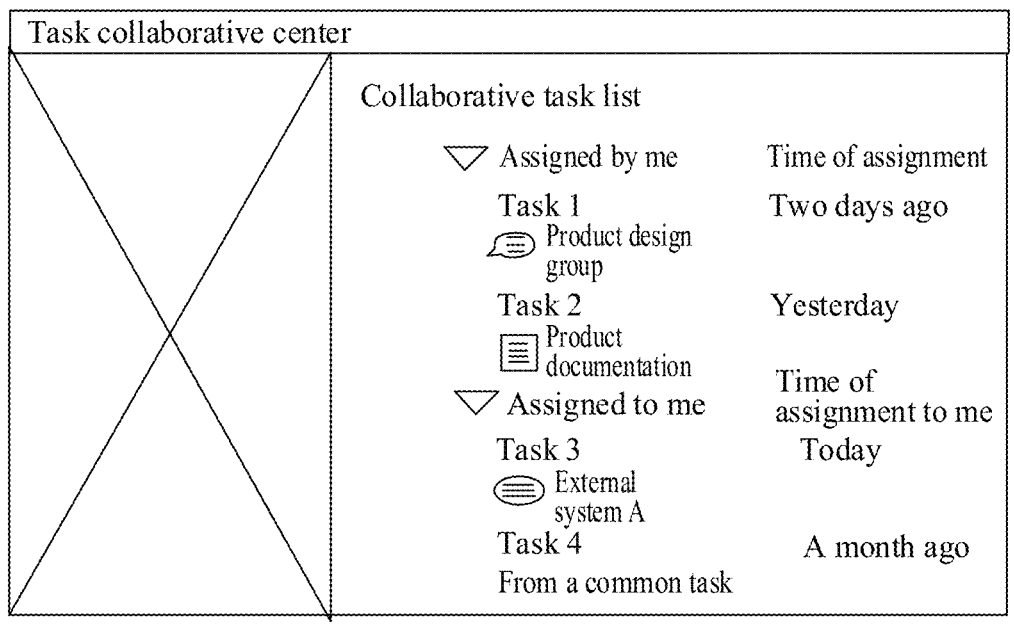
FIG. 3a is a schematic diagram of displaying a task creation source identifier according to an embodiment of the present disclosure.

FIG. 3a is a schematic diagram of displaying a task creation source identifier according to an embodiment of the present disclosure. As shown in FIG. 3a, a task system on a computer is used as an example, and a task creation source identifier of each collaborative task in the collaborative task list is displayed in the collaborative task list related to the first user. A task creation source is consistent with the task creation source type, both including at least one of the common task, the chat, the shared document, and the external third-party system. Therefore, the task creation source identifier also includes at least one of a common task identifier corresponding to the common task, a chat identifier corresponding to the chat, a shared document identifier corresponding to the shared document, and an external third-party system identifier corresponding to the external third-party system. The first user may trigger the task creation source identifier, for example, click the task creation source identifier, and the task system may display, to the first user in response to the trigger operation, the task creation source interface of the collaborative task to which the triggered task creation source identifier belongs.

Figure 3B:
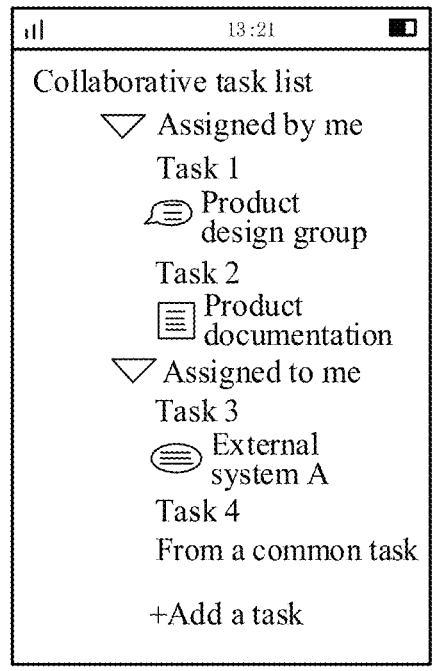
FIG. 3b is a schematic diagram of displaying a task creation source identifier according to another embodiment of the present disclosure.

FIG. 3b is a schematic diagram of displaying a task creation source identifier according to another embodiment of the present disclosure. As shown in FIG. 3b, a task system on a mobile phone is used as an example, and a task creation source identifier of each collaborative task in the collaborative task list is displayed in the collaborative task list related to the first user.

In an embodiment, a task creation source of the collaborative task in the collaborative task list is a chat, and the task creation source identifier is a chat identifier. Accordingly, displaying the task creation source interface of the collaborative task to the first user may be: obtaining the chat corresponding to the chat identifier, and displaying an associated interface of the chat to the first user as the task creation source interface.

As shown in FIG. 3a, a first collaborative task in the collaborative task list related to the first user is a collaborative task created based on a chat, and a task creation source of the first collaborative task is the chat. Accordingly, a chat identifier is displayed below the collaborative task. If the user triggers the chat identifier, the task system may display, to the first user as the task creation source interface, an associated interface of the chat for creating the collaborative task.

In an embodiment, after the chat corresponding to the chat identifier is obtained, before the associated interface of the chat is displayed to the first user, it is determined whether the first user has a permission to browse the chat. If the first user has the permission to browse the chat, the associated interface of the chat is displayed to the first user; or if the first user does not have the permission to browse the chat, a prompt that the first user cannot browse the chat is given. If the first user is a chat member of the chat, it is determined that the first user has the permission to browse the chat; or if the first user is not a chat member of the chat, it is determined that the first user does not have the permission to browse the chat. Certainly, this is only an illustrative manner for determining whether the first user has the permission to browse the chat, and whether the first user has the permission to browse the chat may alternatively be determined in other manners. This is not limited herein.

After it is determined that the first user has the permission to browse the chat, the instant messaging application may be first invoked in the collaborative office software used by the first user to open the chat, where the associated interface of the chat is displayed to the first user in the opened chat, so that the first user stays in the associated interface of the chat, or the first user may continue to send a chat message in the chat. In this case, the associated interface of the chat may be obtained through scrolling in the chat.

In an embodiment, the collaborative task is created by a task creator based on a first task creation entry associated with the chat, and the associated interface of the chat is a random interface of the chat, or is an interface presented by the chat when the task creator creates the collaborative task based on the first task creation entry. The task creator and the first user may be the same user or different users.

Figure 4A:
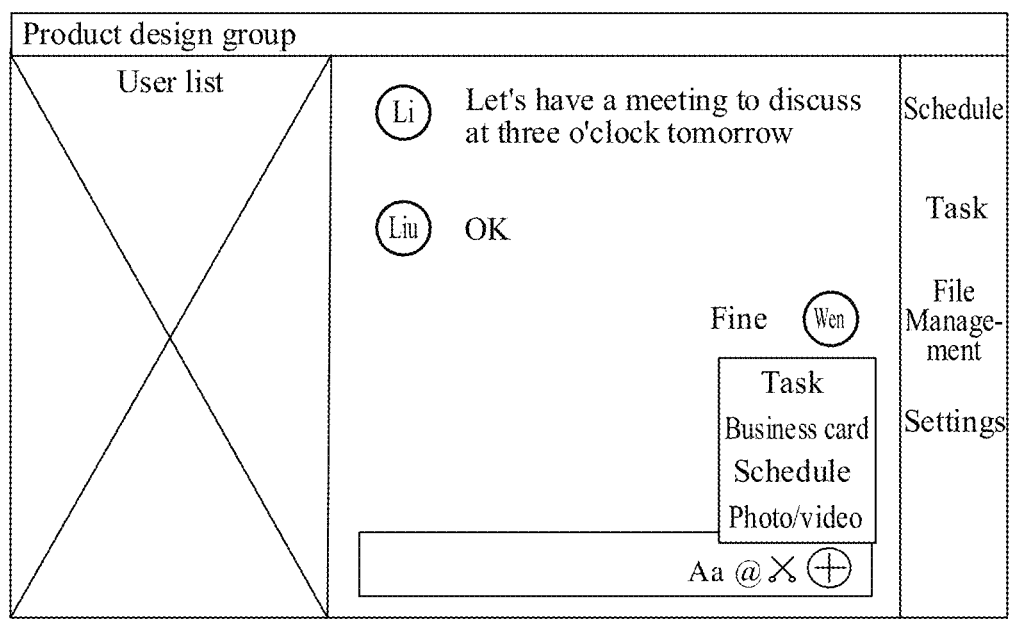
FIG. 4a is a schematic diagram of creating a collaborative task based on a chat according to an embodiment of the present disclosure.

FIG. 4a is a schematic diagram of creating a collaborative task based on a chat according to an embodiment of the present disclosure. As shown in FIG. 4a, in the chat, a task creation entry is displayed in both a right sidebar of the chat and in a drop-up list of "+" in a message input box of the chat. The two task creation entries are first task creation entries. The task creator may create the collaborative task in the chat through the first task creation entry.

In an embodiment, after the task creator creates the collaborative task through the first task creation entry, if the first user triggers the chat identifier as shown in FIG. 3a, a random interface of the chat may be displayed and provided to the first user as the task creation source interface. The random interface of the chat may be obtained by opening the chat. The random interface of the chat may be an interface obtained after the chat is opened, and may be an interface corresponding to any chat content.

Figure 4B:
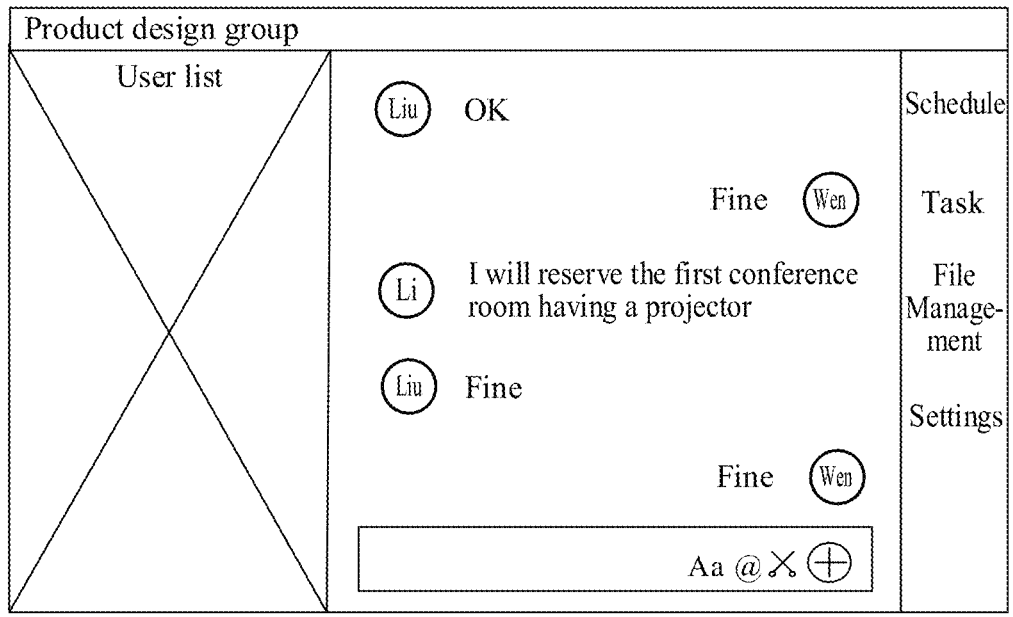
FIG. 4b is a schematic diagram of a task creation source interface according to an embodiment of the present disclosure.

FIG. 4b is a schematic diagram of a task creation source interface according to an embodiment of the present disclosure. After the task creator creates the collaborative task through the aforementioned first task creation entry, if the first user triggers the chat identifier as shown in FIG. 3a, in an embodiment, the interface presented by the chat when the task creator creates the collaborative task through the first task creation entry may be displayed to the first user as the task creation source interface, as shown in FIG. 4b. As shown in FIG. 4b, when the collaborative task is created, chat members in FIG. 4a are discussing a location for holding a meeting.

In another embodiment, the collaborative task is created by the task creator based on a second task creation entry associated with a chat message in the chat, and the associated interface of the chat is an interface where the chat message is located. The task creator and the first user may be the same user or different users.

Figure 4C:
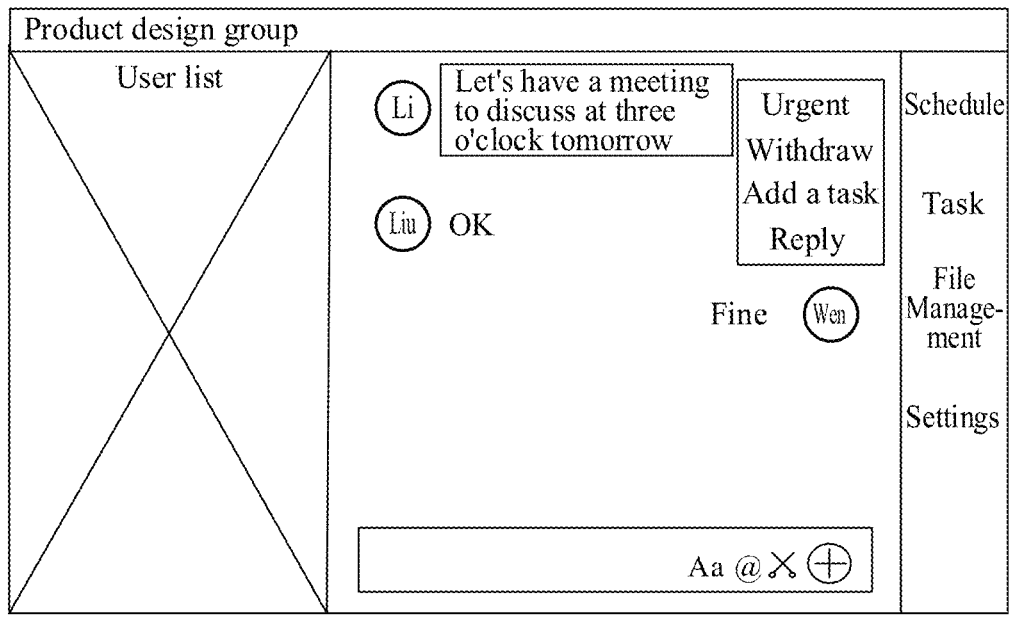
FIG. 4c is a schematic diagram of creating a collaborative task based on a chat according to another embodiment of the present disclosure.

FIG. 4c is a schematic diagram of creating a collaborative task based on a chat according to another embodiment of the present disclosure. As shown in FIG. 4c, in the chat, after a specific chat message is selected, a plurality of operation entries for the chat message may be displayed, including a task creation entry for creating a collaborative task, where the task creation entry is a second task creation entry. The task creator may select the specific chat message in the chat and then create the collaborative task through the second task creation entry.

Figure 4D:
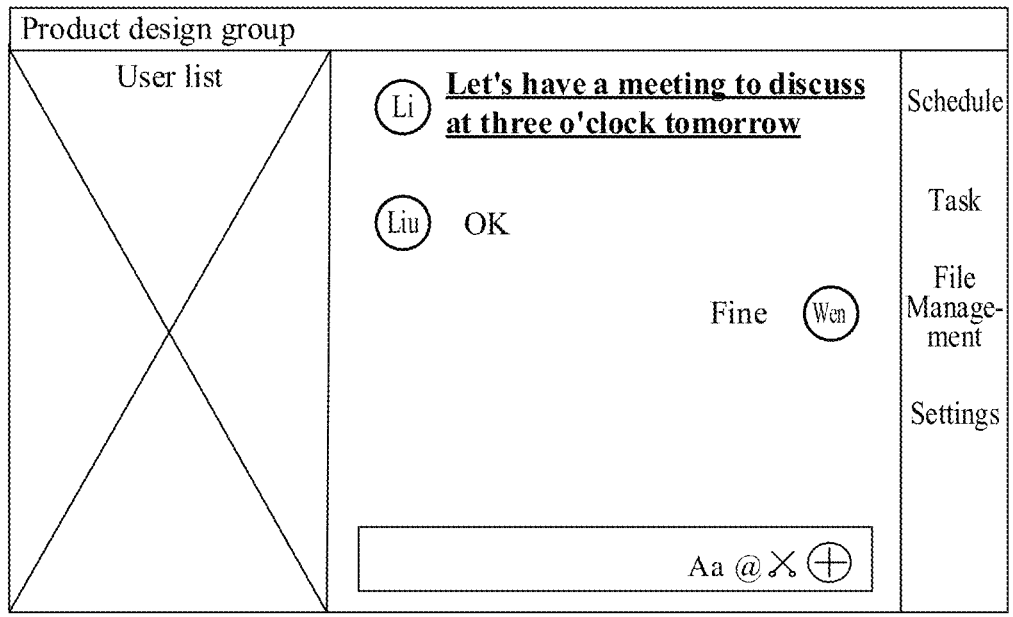
FIG. 4d is a schematic diagram of a task creation source interface according to another embodiment of the present disclosure.

FIG. 4d is a schematic diagram of a task creation source interface according to another embodiment of the present disclosure. After the task creator creates the collaborative task through the aforementioned second task creation entry, if the first user triggers the chat identifier as shown in FIG. 3a, an interface where the chat message for creating the collaborative task in the chat is located may be displayed to the first user as the task creation source interface, as shown in FIG. 4d. In FIG. 4d, there is a chat message "Let's have a meeting to discuss at three o'clock tomorrow" in the task creation source interface, and the collaborative task to which the triggered task creation source identifier belongs is created based on this chat message. Therefore, this chat message is processed in a specific format, for example, made bold and underlined, and then displayed in the task creation source interface.

It can be seen from the above that when the collaborative task is created based on the chat, the associated interface of the chat may be displayed to the first user as the task creation source interface after the first user triggers the chat identifier, so that a requirement of the first user for tracing the task creation source is satisfied.

In an embodiment, a task creation source of the collaborative task in the collaborative task list is a shared document, and the task creation source identifier is a document identifier. Accordingly, displaying the task creation source interface of the collaborative task to the first user may be: obtaining the shared document corresponding to the document identifier, and displaying a content interface of the shared document to the first user as the task creation source interface.

As shown in FIG. 3a, a second collaborative task in the collaborative task list related to the first user is a collaborative task created based on a shared document, and a task creation source of the second collaborative task is the shared document. Accordingly, a document identifier is displayed below the collaborative task. If the user triggers the document identifier, the task system may display, to the first user as the task creation source interface, a content interface of the shared document for creating the collaborative task.

In an embodiment, after the shared document corresponding to the document identifier is obtained, before the content interface of the shared document is displayed to the first user as the task creation source interface, it is determined whether the first user has a permission to browse the shared document. If the first user has the permission to browse the shared document, the content interface of the shared document is displayed to the first user; or if the first user does not have the permission to browse the shared document, a prompt that the first user cannot browse the shared document is given. If the first user is a creator or a specified sharing receiver of the shared document, it is determined that the first user has the permission to browse the shared document; or if the first user is not a creator or a specified sharing receiver of the shared document, it is determined that the first user does not have the permission to browse the shared document. Certainly, this is only an illustrative manner for determining whether the first user has the permission to browse the shared document, and whether the first user has the permission to browse the shared document may alternatively be determined in other manners. This is not limited herein.

After it is determined that the first user has the permission to browse the shared document, the shared document application may be first invoked in the collaborative office software of the first user to open the shared document, where the content interface of the shared document is presented to the first user in the opened shared document, so that the first user stays in the content interface of the shared document, or the first user may also continue to scroll a screen to browse the shared document. In this case, the content interface of the shared document may be obtained through scrolling in the shared document.

In an embodiment, the collaborative task is created by a task creator based on a third task creation entry associated with the shared document, and the content interface is a random content interface of the shared document, or is an interface presented by the shared document when the task creator creates the collaborative task based on the third task creation entry. The task creator and the first user may be the same user or different users.

Figure 5A:
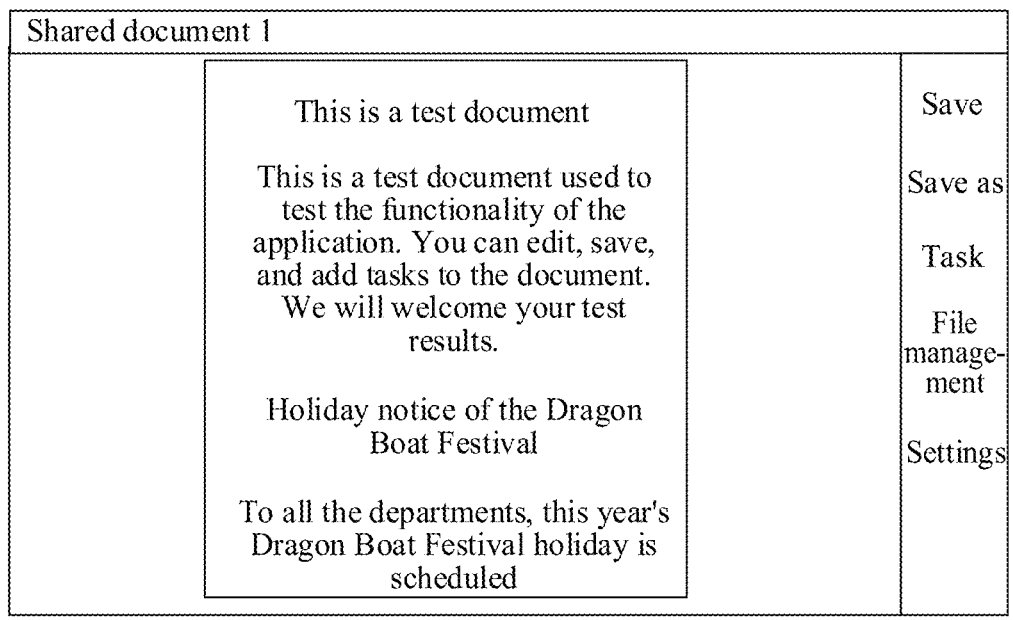
FIG. 5a is a schematic diagram of creating a collaborative task based on a shared document according to an embodiment of the present disclosure.

FIG. 5a is a schematic diagram of creating a collaborative task based on a shared document according to an embodiment of the present disclosure. As shown in FIG. 5a, in the shared document application, a task creation entry is displayed in a right sidebar of a content interface of the shared document. The task creation entry is a third task creation entry. The task creator may create the collaborative task in the shared document application through the third task creation entry.

In an embodiment, after the task creator creates the collaborative task through the third task creation entry, if the first user triggers the document identifier as shown in FIG. 3a, a random content interface of the shared document may be displayed and provided to the first user as the task creation source interface. The random content interface of the shared document may be obtained by opening the shared document. The random content interface of the shared document may be a content interface obtained after the shared document is opened, and may be an interface corresponding to any content.

FIG. 5b is a schematic diagram of a task creation source interface according to another embodiment of the present disclosure. After the task creator creates the collaborative task through the aforementioned third task creation entry, if the first user triggers the document identifier as shown in FIG. 3a, in an embodiment, the content interface presented by the shared document when the task creator creates the collaborative task through the third task creation entry may be displayed to the first user as the task creation source interface, as shown in FIG. 5b. As shown in FIG. 5b, when the collaborative task is created, the shared document in FIG. 5a is displaying content about the Dragon Boat Festival holiday.

In another embodiment, the collaborative task is created by a task creator based on a fourth task creation entry associated with document content in the shared document, and the content interface is an interface where the document content is located. The task creator and the first user may be the same user or different users.

FIG. 5c is a schematic diagram of creating a collaborative task based on a shared document according to another embodiment of the present disclosure. As shown in FIG. 5c, in the shared document application, after a specific part of document content is selected, a plurality of operation entries for the document content may be displayed, including a task creation entry for creating a collaborative task, where the task creation entry is a fourth task creation entry. The task creator may create the collaborative task in the shared document application through the fourth task creation entry after selecting this part of document content.

Figure 5D:
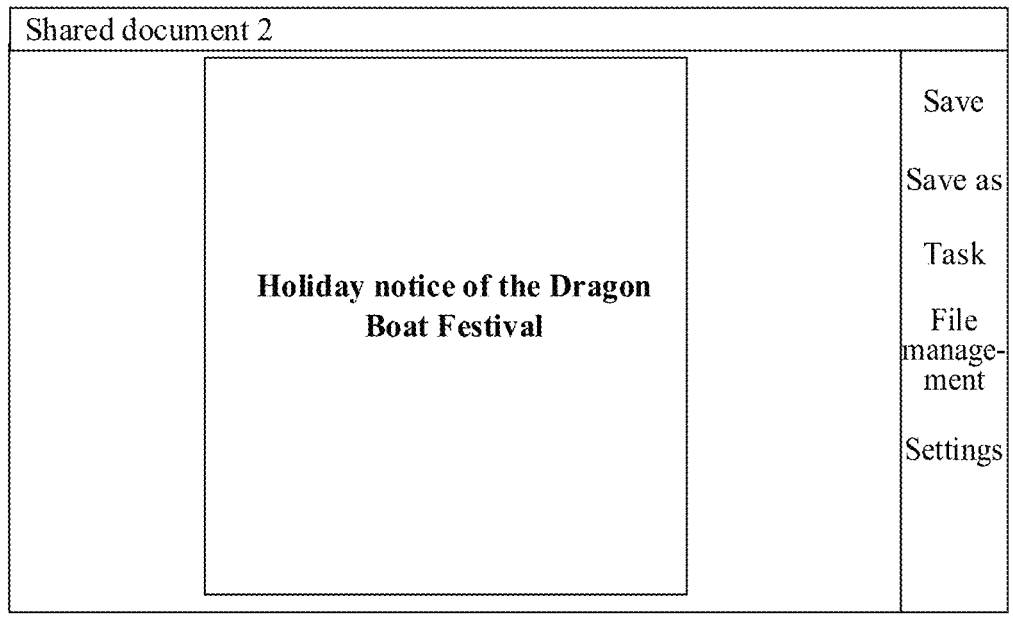
FIG. 5d is a schematic diagram of a task creation source interface according to another embodiment of the present disclosure.

FIG. 5d is a schematic diagram of a task creation source interface according to another embodiment of the present disclosure. After the task creator creates the collaborative task through the aforementioned fourth task creation entry, if the first user triggers the document identifier as shown in FIG. 3a, a content interface in the shared document where the document content for creating the collaborative task is located may be displayed to the first user as the task creation source interface, as shown in FIG. 5d. In FIG. 5d, there is a part of document content "Holiday notice of the Dragon Boat Festival" in the task creation source interface, and the collaborative task to which the triggered task creation source identifier belongs is created based on this part of document content. Therefore, this part of document content is processed in a specific format, for example, made bold, and then displayed in the task creation source interface.

It can be seen from the above that when the collaborative task is created based on the shared document, the content interface of the shared document may be displayed to the first user as the task creation source interface after the first user triggers the chat identifier, so that a requirement of the first user for tracing the task creation source is satisfied.

In an embodiment, a task creation source of the collaborative task in the collaborative task list is an external third-party system, and the task creation source identifier is an external third-party system identifier. Accordingly, displaying the task creation source interface of the collaborative task to the first user may be: determining the external third-party system corresponding to the external third-party system identifier, and displaying a system interface of the external third-party system to the first user as the task creation source interface.

As shown in FIG. 3a, a third collaborative task in the collaborative task list related to the first user is a collaborative task created based on an external third-party system, and a task creation source of the third collaborative task is the external third-party system. Accordingly, an external third-party system identifier is displayed below the collaborative task. If the user triggers the external third-party system identifier, the task system may display, to the first user as the task creation source interface, a system interface of the external third-party system for creating the collaborative task.

In an embodiment, after the external third-party system corresponding to the external third-party system identifier is determined, before the system interface of the external third-party system is displayed to the first user as the task creation source interface, it is determined whether the first user has a permission to enter the external third-party system. If the first user has the permission to enter the external third-party system, the system interface of the external third-party system is displayed to the first user; or if the first user does not have the permission to enter the external third-party system, a prompt that the first user cannot enter the external third-party system is given. If the first user is a registered user of the external third-party system, it is determined that the first user has the permission to enter the external third-party system; or if the first user is not a registered user of the external third-party system, it is determined that the first user does not have the permission to enter the external third-party system. Certainly, this is only an illustrative manner for determining whether the first user has the permission to enter the external third-party system, and whether the first user has the permission to enter the external third-party system may alternatively be determined in other manners. This is not limited herein.

After it is determined that the first user has the permission to enter the external third-party system, a browser of the first user may be first invoked to enter the external third-party system and jump to the system interface of the external third-party system, so that the first user stays in the system interface of the external third-party system, or the first user may perform an interface jump or other system operations in the external third-party system.

In an embodiment, the collaborative task is created by the external third-party system based on a specific operation performed by a system operator in the external third-party system, and the system interface is an interface in the external third-party system that is associated with the specific operation. The system operator and the first user may be the same user or different users.

Specifically, after the system operator performs the specific operation in the external third-party system, the external third-party system may invoke the API provided by the task system, to create the collaborative task based on the specific operation and synchronize the created collaborative task to the task system. For example, after the system operator performs a work order creation operation in the external third-party system, the external third-party system may invoke the API provided by the task system, to create a collaborative task and synchronize the created collaborative task to the task system.

Then, when the external third-party system identifier is triggered by the first user as the task creation source identifier, the interface associated with the aforementioned specific operation in the external third-party system may be displayed to the first user as the task creation source interface. For example, the specific operation is the work order creation operation. In this case, the interface associated with the specific operation in the external third-party system may be a work order details interface. After the first user triggers the external third-party system identifier, a work order details interface of a created work order is displayed to the first user as the task creation source interface.

It can be seen from the above that when the collaborative task is created through the external third-party system, the system interface of the external third-party system may be displayed to the first user as the task creation source interface after the first user triggers the external third-party system identifier, so that a requirement of the first user for tracing the task creation source is satisfied.

In an embodiment, after the filtering result is displayed in the collaborative task center interface of the first user in step S108, the method further includes performing the following step: updating the collaborative task in the collaborative task list in response to an update operation of the first user on the collaborative task list, where an updated collaborative task list supports displaying a collaborative task whose task creation source matches any task creation source type.

Specifically, after the first user filters the collaborative task in the collaborative task list based on the task creation source type, the first user may further update the collaborative task in the collaborative task list. The updated collaborative task list may display the collaborative task whose a task creation source matches any task creation source type. That is, the filtering result obtained by the first user by filtering the collaborative task based on the task creation source type is no longer displayed in the updated collaborative task list, and the filtering result is valid only before the first user updates the collaborative task list.

In an embodiment, a collaborative task that has been completed by the first user is displayed in the collaborative task list of the first user. The first user performs a filter operation on the completed collaborative task based on the task creation source type, to select, from the completed collaborative task, a task from the chat. Then, the first user performs an update operation on the collaborative task list to update the task in the collaborative task list to an unprocessed task. In this case, all unprocessed tasks of the first user are displayed in an updated collaborative task list, and an unprocessed task from the chat is not displayed based on the task filter operation previously performed by the first user.

It can be seen from this embodiment that whenever the first user updates the collaborative task list, a task filter operation previously performed by the first user is invalidated. A reason for this is that if the task filter operation previously performed by the first user is still valid after the first user updates the collaborative task list, the first user may easily mistake the task displayed in the updated task list as all tasks obtained by the first user through updating, and consequently, miss an own task of the first user if the first user forgets that the first user has performed the task filter operation. Invalidating the task filter operation previously performed by the first user after the first user updates the task collaborative list can avoid the first user forgetting that the first user has performed the task filter operation and mistaking the task displayed in the updated task list as all tasks of the first user, thereby preventing the first user from missing the collaborative task of the first user.

Certainly, the update operation of the first user on the task collaborative list may alternatively be performed before the collaborative task is filtered based on the task creation source type. That is, the first user may update the task collaborative list after the collaborative task list related to the first user is displayed.

In an embodiment, updating the collaborative task in the collaborative task list in response to the update operation of the first user on the collaborative task list is specifically:

(a1) determining, in response to the update operation of the first user on the collaborative task list, a target task display dimension to which the first user updates the collaborative task list; and (a2) obtaining a collaborative task related to the first user in the target task display dimension, and updating the collaborative task in the collaborative task list to the collaborative task obtained.

In an embodiment, a user identifier of a second user having a task collaborative relationship with the first user is displayed in the collaborative task center interface of the first user. The aforementioned update operation includes a trigger operation on a user identifier of a target user in the second user.

Accordingly, determining, in response to the update operation of the first user on the collaborative task list, the target task display dimension to which the first user updates the collaborative task list is specifically: (a11) using, in response to the trigger operation of the first user on the user identifier of the target user in the second user, the target user as the target task display dimension to which the first user updates the collaborative task list, where the collaborative task related to the first user in the target task display dimension is a collaborative task between the first user and the target user.

Specifically, user identifiers of a plurality of second users are displayed in the collaborative task center interface of the first user, and the second user is a user having a task collaborative relationship with the first user. The task collaborative relationship includes, but is not limited to, a task assignment relationship, a task sharing relationship, a task review relationship, etc. When the update operation performed by the first user is the trigger operation on the user identifier of the target user in the second user, the target user may be used as the target task display dimension to which the first user updates the collaborative task list. Accordingly, the collaborative task related to the first user in the target task display dimension is the collaborative task between the first user and the target user. Accordingly, the collaborative task in the collaborative task list related to the first user is updated to the collaborative task between the first user and the target user.

Figure 6A:
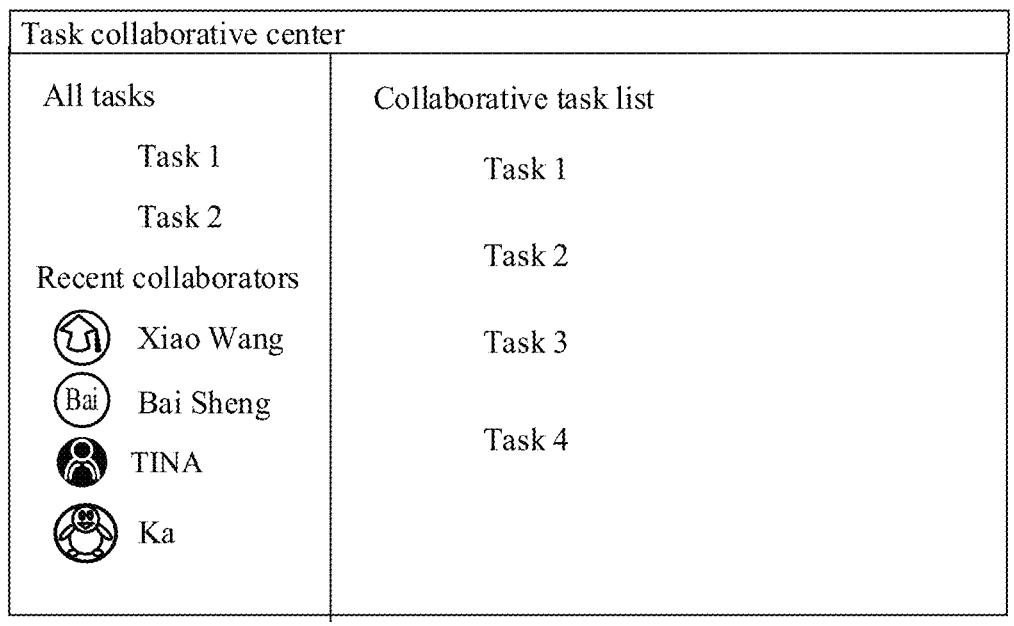
FIG. 6a is a schematic diagram of updating a collaborative task list according to an embodiment of the present disclosure.

FIG. 6a is a schematic diagram of updating a collaborative task list according to an embodiment of the present disclosure. FIG. 6b is a schematic diagram of updating a collaborative task list according to another embodiment of the present disclosure. As shown in FIG. 6a and FIG. 6b, user identifiers of a plurality of second users are displayed on a left side of the collaborative task center interface of the first user. If the first user triggers an identifier of a target user "Xiao Wang" in the second users in FIG. 6a, for example, click an avatar, as shown in FIG. 6b, the target user "Xiao Wang" is used as the target task display dimension, and the collaborative task in the collaborative task list related to the first user is updated to a collaborative task between the first user and Xiao Wang.

It can be seen that in this embodiment, the user identifier of the second user having the task collaborative relationship with the first user may be displayed in the collaborative task center interface of the first user. The collaborative task in the collaborative task list is updated to the collaborative task between the first user and the target user based on the trigger operation of the first user on the user identifier of the target user in the second user and a dimension of the target user triggered by the first user. Therefore, a requirement of the first user for updating the collaborative task list based on a dimension of a collaborative user is satisfied.

In an embodiment, task description information is displayed in the collaborative task center interface, and the update operation includes a trigger operation on target task description information in the task description information.

Accordingly, determining, in response to the update operation of the first user on the collaborative task list, the target task display dimension to which the first user updates the collaborative task list is specifically: using, in response to a trigger operation of the first user on the target task description information in the task description information, the target task description information as the target task display dimension to which the first user updates the collaborative task list, where the collaborative task related to the first user in the target task display dimension is a collaborative task that is related to the first user and that satisfies the target task description information.

Specifically, a plurality of items of task description information are displayed in the collaborative task center interface of the first user. The task description information may include task type-based description information, such as "assigned by me", "assigned to me", "carried out by me", and "followed by me", may further include task attribute-based description information, such as "task unscheduled" and "task with no responsible person designated to", and may further include task status-based description information, such as "completed", "in progress", and "expired". When the update operation performed by the first user is the trigger operation on the target task description information in the task description information, the target task description information may be used as the target task display dimension to which the first user updates the collaborative task list. Accordingly, the collaborative task related to the first user in the target task display dimension is a collaborative task that is related to the first user and that satisfies the target task description information. Accordingly, the collaborative task in the collaborative task list related to the first user is updated to the collaborative task that is related to the first user and that satisfies the target task description information.

Figures 6D, 7:
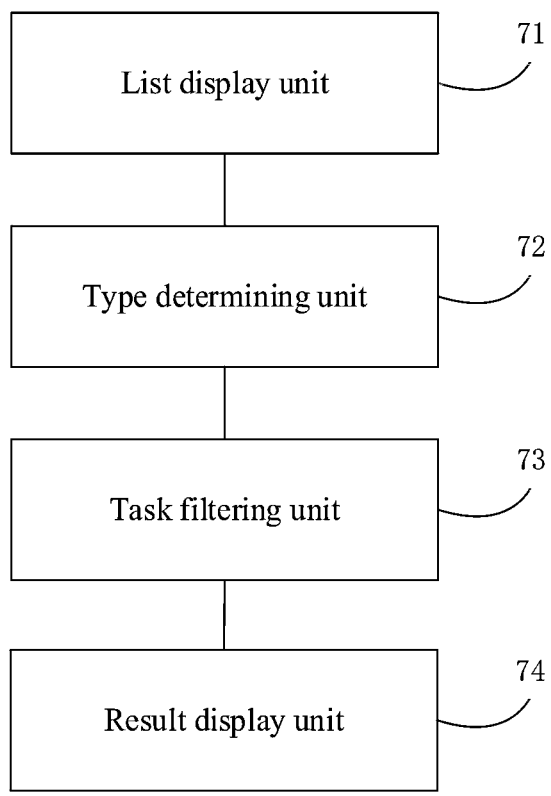
FIG. 6d is a schematic diagram of updating a collaborative task list according to another embodiment of the present disclosure.
FIG. 7 is a schematic diagram of a structure of a collaborative task processing apparatus according to an embodiment of the present disclosure.

FIG. 6c is a schematic diagram of updating a collaborative task list according to another embodiment of the present disclosure. FIG. 6d is a schematic diagram of updating a collaborative task list according to another embodiment of the present disclosure. As shown in FIG. 6c and FIG. 6d, a plurality of items of task description information are displayed on a left side of the collaborative task center interface of the first user. If the first user triggers the target task description information "Task with no responsible person designated to" in FIG. 6a, for example, clicks the target task description information, as shown in FIG. 6d, the target task description information "Task with no responsible person designated to" is used as the target task display dimension, and the collaborative task in the collaborative task list related to the first user is updated to a collaborative task that is related to the first user and to which no responsible person is designated.

It can be seen that in this embodiment, a plurality of items of task description information may be displayed in the collaborative task center interface of the first user. The collaborative task in the collaborative task list is updated, based on the trigger operation of the first user on the target task description information in the task description information and a dimension of the target task description information triggered by the first user, to the collaborative task that is related to the first user and that satisfies the target task description information. Therefore, a requirement of the first user for updating the collaborative task list based on a dimension of the task description information is satisfied.

In summary, according to the above embodiments, the collaborative task can be filtered in the collaborative task center interface of the first user in response to the filter operation of the first user for filtering the collaborative task based on the task creation source type, and the filtering result can be displayed. In addition, the task creation source interface of the collaborative task is displayed to the first user in response to the trigger operation of the first user on the task creation source identifier, to trace the task creation source. Furthermore, the collaborative task in the collaborative task list is updated based on the target task display dimension to which the first user updates the collaborative task list, to update the collaborative task list.

FIG. 7 is a schematic diagram of a structure of a collaborative task processing apparatus according to an embodiment of the present disclosure. As shown in FIG. 7, the apparatus includes:

- a list display unit 71 configured to display a collaborative task list related to a first user in a collaborative task center interface of the first user;
- a type determining unit 72 configured to determine, in response to a filter operation of the first user for filtering a collaborative task based on a task creation source type, a target task creation source type specified by the first user;
- a task filtering unit 73 configured to filter a collaborative task in the collaborative task list based on the target task creation source type; and
- a result display unit 74 configured to display a filtering result in the collaborative task center interface of the first user.

Optionally, the apparatus further includes a source display unit configured to:

- after the collaborative task list related to the first user is displayed, obtain a task creation source identifier corresponding to the collaborative task in the collaborative task list, and display the task creation source identifier in the collaborative task list; and
- display a task creation source interface of the collaborative task to the first user in response to a trigger operation of the first user on the task creation source identifier.

Optionally, a task creation source of the collaborative task is a chat; the task creation source identifier is a chat identifier; and the source display unit is specifically configured to: obtain the chat corresponding to the chat identifier, and display an associated interface of the chat to the first user as the task creation source interface.

Optionally, the collaborative task is created by a task creator based on a first task creation entry associated with the chat, and the associated interface of the chat is an interface presented by the chat when the task creator creates the collaborative task based on the first task creation entry;

or, the collaborative task is created by a task creator based on a second task creation entry associated with a chat message in the chat, and the associated interface of the chat is an interface where the chat message is located.

Optionally, a task creation source of the collaborative task is a shared document; the task creation source identifier is a document identifier; and the source display unit is specifically configured to: obtain the shared document corresponding to the document identifier, and display a content interface of the shared document to the first user as the task creation source interface.

Optionally, the collaborative task is created by a task creator based on a third task creation entry associated with the shared document, and the content interface is an interface presented by the shared document when the task creator creates the collaborative task based on the third task creation entry;

or, the collaborative task is created by a task creator based on a fourth task creation entry associated with document content in the shared document, and the content interface is an interface where the document content is located.

Optionally, a task creation source of the collaborative task is an external third-party system; the task creation source identifier is an external third-party system identifier; and the source display unit is specifically configured to: determine the external third-party system corresponding to the external third-party system identifier, and display a system interface of the external third-party system to the first user as the task creation source interface.

Optionally, the collaborative task is created by the external third-party system based on a specific operation performed by a system operator in the external third-party system; the system interface is an interface in the external third-party system that is associated with the specific operation.

Optionally, the apparatus further includes an update unit configured to: after the filtering result is displayed in the collaborative task center interface of the first user, update the collaborative task in the collaborative task list in response to an update operation of the first user on the collaborative task list, where an updated collaborative task list supports displaying a collaborative task whose task creation source matches any task creation source type.

Optionally, the update unit is specifically configured to:

- determine, in response to the update operation of the first user on the collaborative task list, a target task display dimension to which the first user updates the collaborative task list; and
- obtain a collaborative task related to the first user in the target task display dimension, and update the collaborative task in the collaborative task list to the collaborative task obtained.

Optionally, a user identifier of a second user having a task collaborative relationship with the first user is displayed in the collaborative task center interface of the first user. The update operation includes a trigger operation on a user identifier of a target user in the second user.

The update unit is specifically configured to: use, in response to a trigger operation of the first user on the user identifier of the target user in the second user, the target user as the target task display dimension to which the first user updates the collaborative task list, where the collaborative task related to the first user in the target task display dimension is a collaborative task between the first user and the target user.

Optionally, task description information is displayed in the collaborative task center interface of the first user. The update operation includes a trigger operation on target task description information in the task description information.

The update unit is specifically configured to: use, in response to the trigger operation of the first user on the target task description information in the task description information, the target task description information as the target task display dimension to which the first user updates the collaborative task list, where the collaborative task related to the first user in the target task display dimension is a collaborative task that is related to the first user and that satisfies the target task description information.

It should be noted that the collaborative task processing apparatus in this embodiment can implement the processes in the foregoing collaborative task processing method embodiment and achieve the same effects and functions, which will not be repeated herein.

Figure 8:
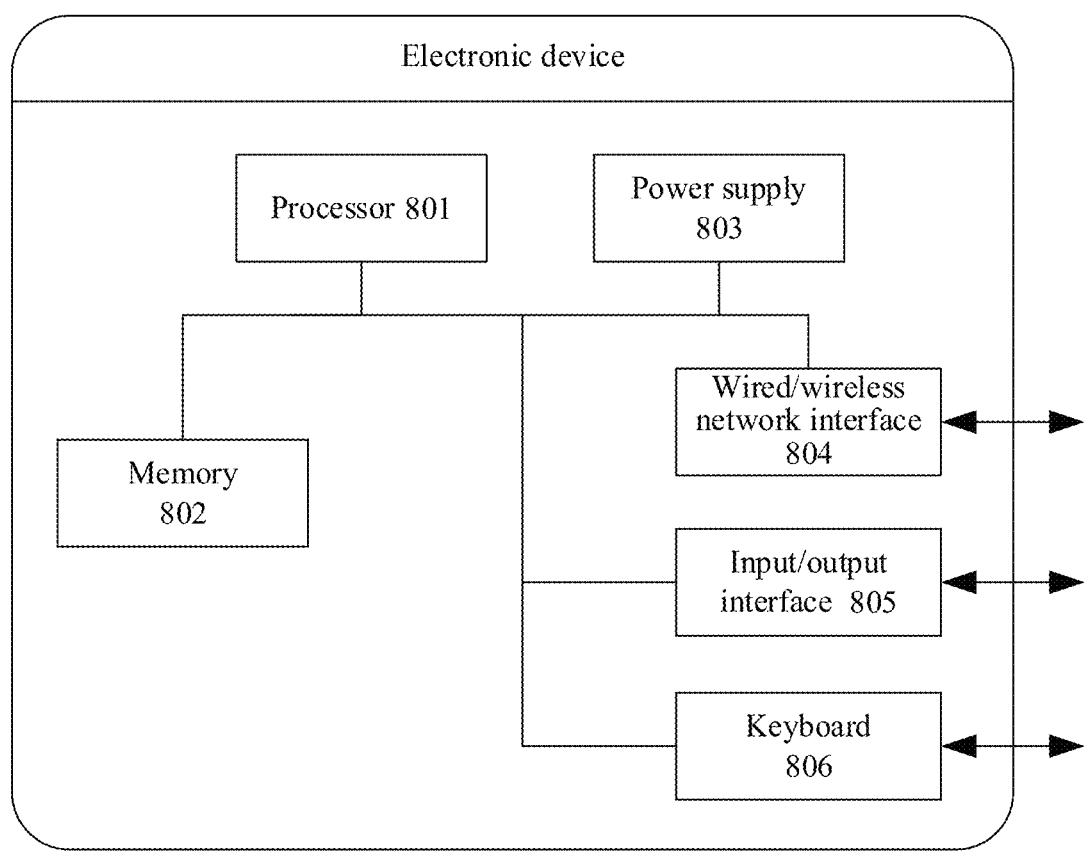
FIG. 8 is a schematic diagram of a structure of an electronic device according to an embodiment of the present disclosure.

An embodiment of the present disclosure further provides an electronic device. FIG. 8 is a schematic diagram of a structure of the electronic device according to an embodiment of the present disclosure. As shown in FIG. 8, the electronic device may have large differences due to different configurations or performance, and may include one or more processors 801 and memories 802. The memory 802 may store one or more application programs or data. The memory 802 may perform temporary storage or permanent storage. The application program stored in the memory 802 may include one or more modules (not shown in the figure), and each module may include a series of computer-executable instructions in the electronic device. Still further, the processor 801 may be configured to communicate with the memory 802, and execute, on the electronic device, the series of computer-executable instructions in the memory 802. The electronic device may further include one or more power supplies 803, one or more wired or wireless network interfaces 804, one or more input or output interfaces 805, one or more keyboards 806, etc.

In a specific embodiment, the electronic device may be a server or terminal device for an instant messaging application, and includes a processor and a memory configured to store computer-executable instructions that, when executed by the processor, cause the processor to implement the following procedure:
  displaying a collaborative task list related to a first user in a collaborative task center interface of the first user;
  determining, in response to a filter operation of the first user for filtering a collaborative task based on a task creation source type, a target task creation source type specified by the first user;
  filtering a collaborative task in the collaborative task list based on the target task creation source type; and
  displaying a filtering result in the collaborative task center interface of the first user.

It should be noted that the electronic device in this embodiment can implement the processes in the foregoing collaborative task processing method embodiment and achieve the same effects and functions, which will not be repeated herein.

Another embodiment of the present disclosure further provides a computer-readable storage medium, configured to store computer-executable instructions that, when executed by a processor, cause the following procedure to be implemented:
  displaying a collaborative task list related to a first user in a collaborative task center interface of the first user;
  determining, in response to a filter operation of the first user for filtering a collaborative task based on a task creation source type, a target task creation source type specified by the first user;
  filtering a collaborative task in the collaborative task list based on the target task creation source type; and
  displaying a filtering result in the collaborative task center interface of the first user.

It should be noted that the storage medium in this embodiment can implement the processes in the foregoing collaborative task processing method embodiment and achieve the same effects and functions, which will not be repeated herein.

The computer-readable storage medium includes a read-only memory (ROM), a random access memory (RAM), a magnetic disk, an optical disc, etc.

In the 1990s, an improvement to a technology could be clearly distinguished between an improvement on hardware (for example, an improvement to a circuit structure such as a diode, a transistor, and a switch) or an improvement on software (for method processes). However, with development of technologies, many improvements on the method processes today can be considered as direct improvements on a hardware circuit structure. Designers almost always obtain a corresponding hardware circuit structure by programming an improved method process into a hardware circuit. Therefore, this does not mean that the improvement on the method process cannot be implemented by a hardware entity module. For example, a programmable logic device (PLD) (for example, a field programmable gate array (FPGA)) is such an integrated circuit whose logic function is determined by device programming by a user. The designers perform programming to "integrate" a digital system into a PLD, with no need to ask a chip manufacturer to design and manufacture a dedicated integrated circuit chip. Nowadays, in place of manual fabrication of integrated circuit chips, such programming is mostly implemented by using "logic compiler" software, which is similar to a software compiler used for writing during program development, and the original code to be compiled is also written in a specific programming language called a hardware description language (HDL). There is not only one HDL, but many HDLs, for example, Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). Currently, Very-High-Speed Integrated Circuit Hardware Description Language (VHDL) and Verilog are most commonly used. Those skilled in the art should also be aware that the method process merely needs to be programmed into the integrated circuit through logic programming by using the foregoing several hardware description languages, to easily obtain the hardware circuit for implementing the logical method process.

The controller may be implemented in any suitable manner. For example, the controller may be in a form of, for example, a microprocessor or processor and a computer-readable medium storing computer-readable program code (such as software or firmware) executable by the (micro) processor, a logic gate, a switch, an application specific integrated circuit (ASIC), a programmable logic controller, or an embedded microcontroller. Examples of the controller include, but are not limited to, the following microcontrollers: ARC 625D, Atmel AT91SAM, Microchip PIC18F26K20, and Silicone Labs C8051F320. The memory controller may alternatively be implemented as part of control logic of the memory. Those skilled in the art also know that in addition to implementation of the controller in a manner of pure computer-readable program code, logic programming may be performed on the method steps to enable the controller to implement a same function in a form of a logic gate, a switch, an application specific integrated circuit, a programmable logic controller, and an embedded microcontroller. Therefore, the controller can be considered as a hardware component, and an apparatus, included in the controller, for implementing various functions can also be considered as a structure within the hardware component. Alternatively, an apparatus for implementing various functions may be considered as either a software module implementing the method or a structure within the hardware component.

The systems, apparatuses, modules, or units explained in the foregoing embodiments may be specifically implemented by a computer chip or entity, or implemented by a product having a particular function. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or a combination of these devices.

For ease of description, when described, the above apparatus is divided into various units based on functions. Certainly, functions of the units may be implemented in one or more pieces of software and/or hardware when the embodiments of the present disclosure are implemented.

Those skilled in the art should understand that the one or more embodiments of the present disclosure may be provided as a method, a system, or a computer program product. Therefore, the one or more embodiments of the present disclosure may take the form of an entirely hardware embodiment, an entirely software embodiment, or an embodiment combining software and hardware aspects. Moreover, the one or more embodiments of the present disclosure may take the form of a computer program product implemented on one or more computer-usable storage media (including, but not limited to, a disk memory, a CD-ROM, an optical memory, etc.) containing computer-usable program code.

The present disclosure is described with reference to the flowcharts and/or block diagrams of the methods, the devices (systems), and the computer program products according to the embodiments of the present disclosure. It should be understood that each process and/or block in the flowcharts and/or block diagrams, or a combination of the processes and/or blocks in the flowcharts and/or block diagrams may be implemented by computer program instructions. These computer program instructions may be provided to a processor of a general-purpose computer, a special-purpose computer, an embedded processor, or another programmable data processing device to produce a machine, so that the instructions executed by the processor of the computer or the another programmable data processing device create an apparatus for implementing functions specified in one or more processes in the flowcharts and/or one or more blocks in the block diagrams.

These computer program instructions may alternatively be stored in a computer-readable memory that can instruct the computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

It should be noted that the terms "include" and "comprise" or any other variant thereof is intended to cover a non-exclusive inclusion, so that a process, a method, a commodity, or a device including a list of elements not only includes those elements but also includes other elements that are not expressly listed, or further includes elements inherent to such process, method, commodity, or device. In the absence of more restrictions, an element defined by "including a . . . " does not exclude another identical element in a process, method, commodity, or device that includes the element.

The one or more embodiments of the present disclosure may be described in general context of computer-executable instructions executed by a computer, for example, a program module. Generally, the program module includes a routine, a program, an object, a component, a data structure, etc. that performs a specified task or implements a specified abstract data type. The one or more embodiments of the present disclosure may alternatively be practiced in distributed computing environments. In the distributed computing environments, tasks are performed by remote processing devices connected through a communication network. In the distributed computing environments, the program module may be located in local and remote computer storage media including storage devices.

The embodiments in the present disclosure are described in a progressive manner. For the same or similar parts between the embodiments, reference may be made to each other. Each embodiment focuses on differences from other embodiments. Especially, the system embodiment is basically similar to the method embodiment, and therefore is described briefly. For related parts, reference may be made to partial descriptions in the method embodiment.

The foregoing descriptions are only embodiments of the present disclosure, but the present disclosure is not limited to such embodiments. Various modifications and variations may be made by those skilled in the art. Any modification, equivalent replacement, improvement, etc. made within the spirit and principle of the present disclosure shall fall within the scope of the claims of the present disclosure.

The invention claimed is:

1. A collaborative task processing method, comprising:
displaying a collaborative task list related to a first user in a collaborative task center interface of a task system of the first user, wherein the collaborative task in the collaborative task list comprises at least one selected from a group consisting of a collaborative task created in the task system, a collaborative task created in an instant messaging application, a collaborative task created in a shared document application, and a collaborative task created in an external third-party system; and the task system, the instant messaging application, and the shared document application are integrated in a collaborative office software;
determining, in response to a filter operation of the first user for filtering a collaborative task based on a task creation source type, a target task creation source type specified by the first user;
filtering a collaborative task in the collaborative task list based on the target task creation source type; and
displaying a filtering result in the collaborative task center interface of the first user.

2. The collaborative task processing method according to claim 1, wherein after the displaying a collaborative task list related to a first user, the method further comprises:
obtaining a task creation source identifier corresponding to the collaborative task in the collaborative task list, and displaying the task creation source identifier in the collaborative task list; and
displaying a task creation source interface of the collaborative task to the first user in response to a trigger operation of the first user on the task creation source identifier.

3. The collaborative task processing method according to claim 2, wherein a task creation source of the collaborative task is a chat; the task creation source identifier is a chat identifier; and
the displaying a task creation source interface of the collaborative task to the first user comprises: obtaining the chat corresponding to the chat identifier, and displaying an associated interface of the chat to the first user as the task creation source interface.

4. The collaborative task processing method according to claim 3, wherein
the collaborative task is created by a task creator based on a first task creation entry associated with the chat, and the associated interface of the chat is a random interface of the chat, or is an interface presented by the chat when the task creator creates the collaborative task based on the first task creation entry;
or
the collaborative task is created by a task creator based on a second task creation entry associated with a chat message in the chat, and the associated interface of the chat is an interface where the chat message is located.

5. The collaborative task processing method according to claim 2, wherein a task creation source of the collaborative task is a shared document; the task creation source identifier is a document identifier; and
the displaying a task creation source interface of the collaborative task to the first user comprises: obtaining the shared document corresponding to the document identifier, and displaying a content interface of the shared document to the first user as the task creation source interface.

6. The collaborative task processing method according to claim 5, wherein
the collaborative task is created by a task creator based on a third task creation entry associated with the shared document, and the content interface is a random content interface of the shared document, or is an interface presented by the shared document when the task creator creates the collaborative task based on the third task creation entry;
or
the collaborative task is created by a task creator based on a fourth task creation entry associated with document content in the shared document, and the content interface is an interface where the document content is located.

7. The collaborative task processing method according to claim 2, wherein a task creation source of the collaborative task is an external third-party system; the task creation source identifier is an external third-party system identifier; and
the displaying a task creation source interface of the collaborative task to the first user comprises: determining the external third-party system corresponding to the external third-party system identifier, and displaying a system interface of the external third-party system to the first user as the task creation source interface.

8. The collaborative task processing method according to claim 7, wherein
the collaborative task is created by the external third-party system based on a specific operation performed by a system operator in the external third-party system; and the system interface is an interface in the external third-party system that is associated with the specific operation.

9. The collaborative task processing method according to claim 1, wherein after the displaying a filtering result in the collaborative task center interface of the first user, the method further comprises:
updating the collaborative task in the collaborative task list in response to an update operation of the first user on the collaborative task list,
wherein an updated collaborative task list supports displaying a collaborative task whose task creation source matches any task creation source type.

10. The collaborative task processing method according to claim 9, wherein the updating the collaborative task in the collaborative task list in response to an update operation of the first user on the collaborative task list comprises:
determining, in response to the update operation of the first user on the collaborative task list, a target task display dimension to which the first user updates the collaborative task list; and
obtaining a collaborative task related to the first user in the target task display dimension, and updating the collaborative task in the collaborative task list to the collaborative task obtained.

11. The collaborative task processing method according to claim 10, wherein a user identifier of a second user having a task collaborative relationship with the first user is displayed in the collaborative task center interface of the first user; the update operation comprises a trigger operation on a user identifier of a target user in the second user; and
the determining, in response to the update operation of the first user on the collaborative task list, a target task display dimension to which the first user updates the collaborative task list comprises: using, in response to the trigger operation of the first user on the user identifier of the target user in the second user, the target user as the target task display dimension to which the first user updates the collaborative task list, wherein the collaborative task related to the first user in the target task display dimension is a collaborative task between the first user and the target user.

12. The collaborative task processing method according to claim 10, wherein task description information is displayed in the collaborative task center interface of the first user; the update operation comprises a trigger operation on target task description information in the task description information; and
the determining, in response to the update operation of the first user on the collaborative task list, a target task display dimension to which the first user updates the collaborative task list comprises: using, in response to the trigger operation of the first user on the target task description information in the task description information, the target task description information as the target task display dimension to which the first user updates the collaborative task list, wherein the collaborative task related to the first user in the target task display dimension is a collaborative task that is related to the first user and that satisfies the target task description information.

13. An electronic device, comprising:
at least one processor; and
at least one memory configured to store computer-executable instructions that, when executed by the at least one processor, cause the at least one processor to implement a collaborative task processing method, and the collaborative task processing method comprises:
displaying a collaborative task list related to a first user in a collaborative task center interface of a task system of the first user, wherein the collaborative task in the collaborative task list comprises at least one selected from a group consisting of a collaborative task created in the task system, a collaborative task created in an instant messaging application, a collaborative task created in a shared document application, and a collaborative task created in an external third-party system; and the task system, the instant messaging application, and the shared document application are integrated in a collaborative office software;
determining, in response to a filter operation of the first user for filtering a collaborative task based on a task creation source type, a target task creation source type specified by the first user;
filtering a collaborative task in the collaborative task list based on the target task creation source type; and
displaying a filtering result in the collaborative task center interface of the first user.

14. The electronic device according to claim 13, wherein after the displaying a collaborative task list related to a first user, the method further comprises:
obtaining a task creation source identifier corresponding to the collaborative task in the collaborative task list, and displaying the task creation source identifier in the collaborative task list; and
displaying a task creation source interface of the collaborative task to the first user in response to a trigger operation of the first user on the task creation source identifier.

15. The collaborative task processing method according to claim 14, wherein a task creation source of the collaborative task is a chat; the task creation source identifier is a chat identifier; and
the displaying a task creation source interface of the collaborative task to the first user comprises: obtaining the chat corresponding to the chat identifier, and displaying an associated interface of the chat to the first user as the task creation source interface.

16. The electronic device according to claim 15, wherein the collaborative task is created by a task creator based on a first task creation entry associated with the chat, and the associated interface of the chat is a random interface of the chat, or is an interface presented by the chat when the task creator creates the collaborative task based on the first task creation entry;
or
the collaborative task is created by a task creator based on a second task creation entry associated with a chat message in the chat, and the associated interface of the chat is an interface where the chat message is located.

17. The electronic device according to claim 14, wherein a task creation source of the collaborative task is a shared document; the task creation source identifier is a document identifier; and
the displaying a task creation source interface of the collaborative task to the first user comprises: obtaining the shared document corresponding to the document identifier, and displaying a content interface of the shared document to the first user as the task creation source interface.

18. The electronic device according to claim 17, wherein the collaborative task is created by a task creator based on a third task creation entry associated with the shared document, and the content interface is a random content interface of the shared document, or is an interface presented by the shared document when the task creator creates the collaborative task based on the third task creation entry;
or
the collaborative task is created by a task creator based on a fourth task creation entry associated with document content in the shared document, and the content interface is an interface where the document content is located.

19. The electronic device according to claim 14, wherein a task creation source of the collaborative task is an external third-party system; the task creation source identifier is an external third-party system identifier; and
the displaying a task creation source interface of the collaborative task to the first user comprises: determining the external third-party system corresponding to the external third-party system identifier, and displaying a system interface of the external third-party system to the first user as the task creation source interface.

20. A non-transient computer-readable storage medium, configured to store computer-executable instructions that, when executed by a processor, implement a collaborative task processing method, and the collaborative task processing method comprises:
displaying a collaborative task list related to a first user in a collaborative task center interface of a task system of the first user, wherein the collaborative task in the collaborative task list comprises at least one selected from a group consisting of a collaborative task created in the task system, a collaborative task created in an instant messaging application, a collaborative task created in a shared document application, and a collaborative task created in an external third-party system; and the task system, the instant messaging application, and the shared document application are integrated in a collaborative office software;
determining, in response to a filter operation of the first user for filtering a collaborative task based on a task creation source type, a target task creation source type specified by the first user;
filtering a collaborative task in the collaborative task list based on the target task creation source type; and
displaying a filtering result in the collaborative task center interface of the first user.

* * * * *